United States Patent Office 3,558,998
Patented Jan. 26, 1971

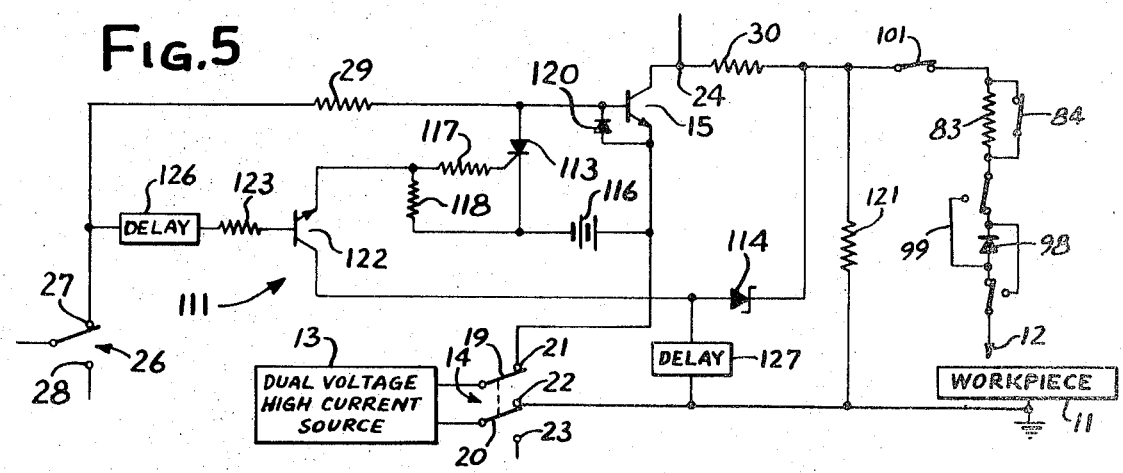
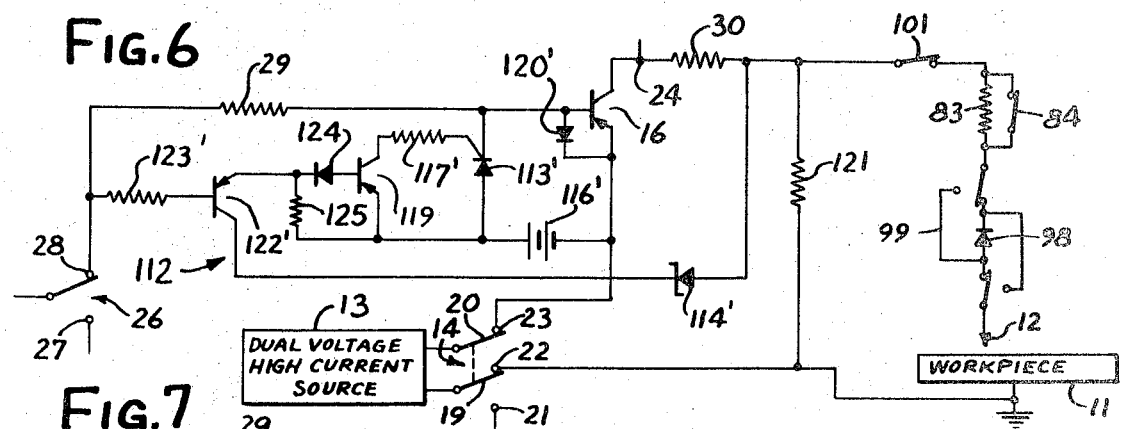
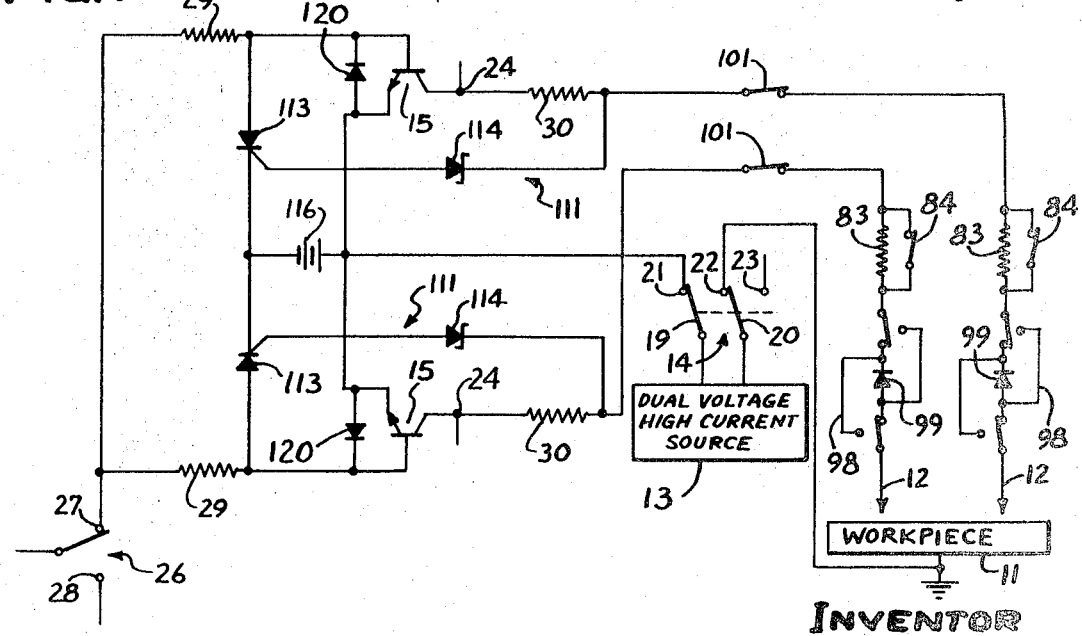

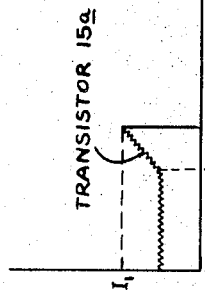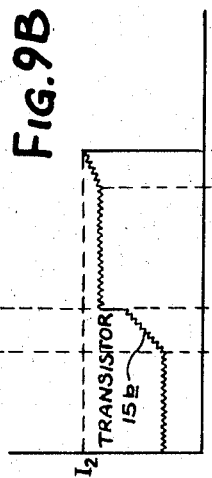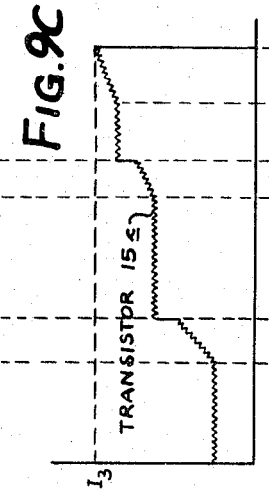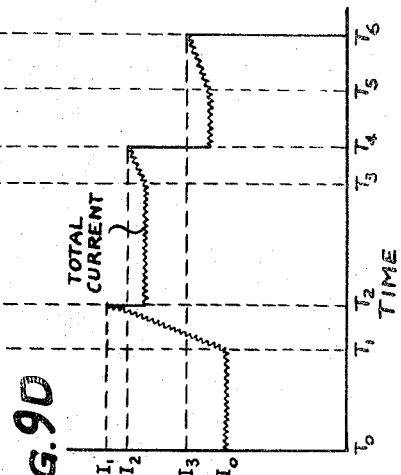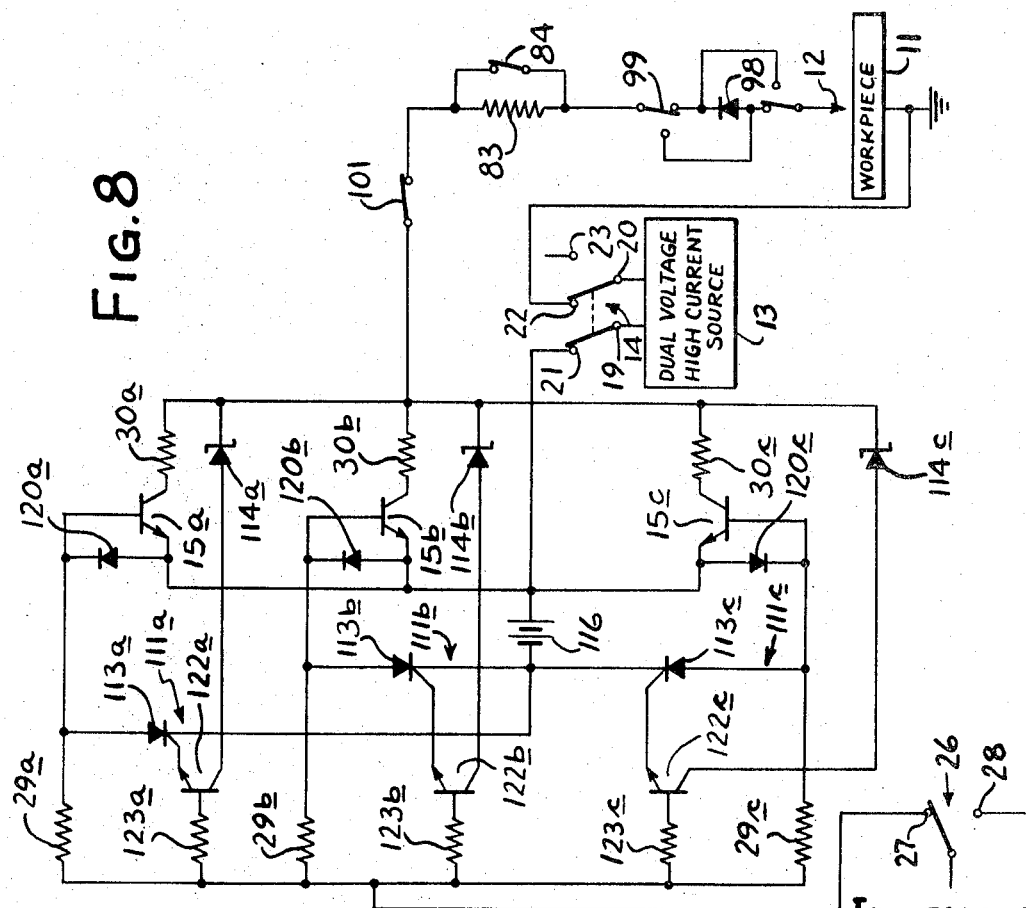

3,558,998
REVERSIBLE POLARITY UNIVERSAL ELECTRICAL DISCHARGE MACHINING POWER SUPPLY WITH CURRENT CUT-OFF
Robert B. Bertolasi, Rockford, Ill., assignor, by mesne assignments, to Amsted Industries, Incorporated, Chicago, Ill., a corporation of Delaware
Filed May 7, 1968, Ser. No. 727,199
Int. Cl. H05b 37/00
U.S. Cl. 315—227                58 Claims

ABSTRACT OF THE DISCLOSURE

A reversible polarity electrical discharge machining power supply which is selectively operable in a capacitor discharge-type or a pulse-type mode for providing machining discharges through one or more ionizable gaps each of which is defined between a respective electrode and a workpiece. For each of the electrodes there is a pair of oppositely polarized power switches to intermittently provide current flow between the electrode and a power source, and for each of the power switches there is a current cut-off circuit to interrupt an excessive current flow therethrough without affecting the operation of the other power switches.

BACKGROUND OF THE INVENTION

The present invention relates to electrical power supplies, and more particularly, to power supplies for electrical discharge machining.

In electrical discharge machining, which is sometimes also referred to as spark machining or electro-erosion, particles are dislodged from a conductive workpiece by electrical discharges or sparks which are passed through an ionized gap which is defined between a shaped electrode tool and an electrically conductive workpiece. The general rule is that each discharge will occur between the most closely spaced electrode and workpiece points, and, therefore, to obtain the desired machined configuration for the workpiece, one or more electrodes, each shaped to contribute to the formation of a complementary configuration, are successively employed. The size of the particles dislodged by each discharge, and consequently the surface finish obtained, is dependent upon the composition of the workpiece and the energy content of the discharge. Provision is therefore generally made to control the discharge energy, such as by varying one or more of the discharge repetition rate, duty cycle and current.

The distinctive advantage of this form of machining over conventional machining methods is that the tools need not, and desirably do not, physically engage the workpiece. As a result, they may be manufactured from inexpensive and easily worked conductive materials, even though hard metals, such as tungsten carbide or alloy steel, are to be machined.

At the outset, the major emphasis in the art was on so-called "single-lead" or "single-electrode" equipment in which discharges are passed through only one gap. This type of equipment is still of importance, particularly for small jobs, such as performing a single cut on a workpiece. But, to obtain higher production rates for larger jobs, a demand has developed for what may be referred to as "multi-lead" or "multi-electrode" equipment in which discharges are simultaneously passed through a number of ionized gaps, each of which is defined between the workpiece and a respective electrode tool. As will become clearer hereinafter, the present invention is primarily concerned with multi-electrode electrical discharge machining power supplies, but certain of its features are equally applicable to single-electrode supplies.

Electrical discharge machining may be carried out with either "straight" or "reverse" polarity discharges, and, in its present stage of development, at repetition rates or frequencies of up to about 300,000 discharges per second. As a matter of definition, in "straight" or "normal" polarity operation the workpiece is positive and the electrode is negative, while in "reverse" polarity operation the workpiece is negative and the electrode is positive.

The polarity and frequency to be used for optimum performance with either single or multi-electrode equipment depends primarily upon (1) the composition of the electrodes and of the workpiece, (2) the expense of manufacturing the electrodes, and (3) the desired workpiece surface finish. The weighing of these factors under most of the different conditions encountered in electrical discharge machining is commonplace to operators of single-electrode equipment and need not be reviewed here. What is important to note insofar as the instant invention is concerned is that, while provision has been made in previous multi-electrode equipment to vary the discharge frequency, no suitable provision has been made therein to reverse the discharge polarity.

To prevent successive discharges from deteriorating into a thermal or welding arc, it is necessary to maintain a time-spacing between them. For this purpose most modern electrical discharge machining power supplies incorporate a power switch which is connected between a power source and the electrode-to-workpiece gap and which is intermittently opened and closed to provide power from the source in a series of discrete pulses. With this general arrangement, there are two different machining methods, each of which requires different power supply characteristics. The first, which may be referred to as "capacitor discharge-type" operation, involves a capacitive storage circuit which is connected across the gap and which is charged by each of the power pulses to a level sufficient to ionize or break down the gap whereupon the effective resistance of the gap is sharply reduced causing the storage circuit to discharge therethrough. The addition of capacitance in this manner has an intensifying effect on the discharge energy level and, therefore, the primary requirement of the power supply is that the power pulses be of sufficient voltage and power to permit the capacitive storage circuit to charge to the relatively high level necessary to ionize the gap. Noteworthy is that, even at the higher repetition rates, the power level of the power pulses may be considerably below the desired discharge energy level. In the second method, which may be referred to as "pulse-type" operation, the power pulses are applied directly across the gap. There is no energy intensifying effect. However, high voltage pilot pulses may be supplied to ionize the gap, so that the primary requirement, insofar as the power pulses are concerned, is that they have sufficient current to provide the desired discharge energy.

Capacitor discharge-type and pulse-type operation each has its distinctive advantages and disadvantages, with the result that, under some conditions, one mode is best, while, under other conditions, the other mode is preferable. To illustrate this point with a few general examples, the capacitor discharge mode involves a high peak discharge current, with the advantages of providing (1) a higher metal removal rate for a given supply current at a given discharge repetition rate and duty cycle, (2) less electrode heating, and (3) a greater time separation between successive discharges. But, it has the disadvantages of involving (1) a higher wear ratio; i.e., the ratio of erosion from the electrode to erosion from the workpiece, and (2) destruction of certain materials, such as carbon, which are commonly employed as electrodes. On the other hand the pulse-type mode, which involves a substantially constant discharge current, has the advantages of providing (1) a lower wear ratio and (2) where pilot pulses are provided, lower voltage power pulses may be employed thereby permitting higher currents to be passed by the power switch without requiring an increased power dissipation rating for the switch. However, it has the disadvantages of involving (1) a decreased metal removal rate for a given supply current with a given discharge repetition rate and duty cycle, (2) a decreased time separation between successive discharges, and (3) increased electrode heating. It should, of course, be understood that in mentioning these particular advantages and disadvantages no representation is made or intended that each of them exists under any given set of conditions or that others do not exist.

The important point is that, as a general rule, previously available electrical discharge machining power supplies of the type employing a power switch to provide power pulses have been efficiently operable in only one or the other of the above-described modes, not in both. One reason for this is that, in the present state of the switch art, particularly the electronic switch art, the required power dissipation rating for the power switch is unrealistically high, requiring a very expensive specially designed power switch, if the switch is to pass power pulses with both the high voltage level necessary for capacitor discharge-type operation and the high current level required for pulse-type operation.

Generally, an electrical discharge machining power supply for either straight or reverse polarity machining through either capacitor discharge-type or pulse-type operation comprises a power switch for each of the electrodes or for each group of electrodes and a pulser to alternately switch these "on" and "off." With this arrangement, the practice has developed of providing a current cut-off circuit for interrupting an excessive current flow through any one of the gaps to protect the workpiece and power switches from the damaging effects thereof. However, the current cut-off circuits which have been suggested heretofore have been, for the most part, of the type that disable the pulser to open the power switches in response to an overcurrent condition. That is not particularly serious in the case of a single-electrode supply. But, for multi-electrode supplies, it has the significant drawback that all power switches are opened, even if an excessive current is being drawn through only one of the gaps. The result is that the ratio of machining time to shut-down time is decreased as the number of electrodes is increased, thereby reducing the efficiency that is realized in practice far below that which is theoretically obtainable.

SUMMARY OF THE INVENTION

With the foregoing in mind, it is a general object of the present invention to provide an economical, efficient and flexible reversible polarity electrical discharge machining power supply which may be set by simple and reliable adjustments to operate in a variety of different machining modes. A more detailed object is to provide an electrical discharge machining power supply which is selectively operable to provide straight or reverse polarity machining discharges through pulse-type or capacitor discharge-type operation. A related object is to provide a power supply of the foregoing type in which only a few changes need be made to convert from one machining mode or one machining polarity to the other, and in which these changes are readily effected. Another related object is to provide a multi-electrode electrical discharge machining power supply which is selectively operable to provide straight or reverse polarity machining discharges through capacitor discharge-type or pulse-type operation.

An object of the present invention, in one of its aspects, is to provide an electrical discharge machining power supply which is selectively operable to provide straight or reverse polarity machining of a workpiece, and wherein the workpiece remains at a fixed reference potential regardless of the polarity selected. A related object is to provide a reversible polarity, multi-electrode electrical discharge machining power supply which may be used to provide either straight or reverse polarity machining of a single, electrically continuous workpiece.

An object of the invention, in another of its aspects, is to provide a current cut-off circuit which is responsive to an excessive current flow through a pulse controlled power switch to interrupt such current flow for the remaining portion of any existing control pulse without disabling the source of control pulses itself. A more specific object is to provide a current cut-off circuit of the foregoing type for the power switches of an electrical discharge machining power supply. A detailed object is to provide a current cut-off circuit of the foregoing type for each of the power switches of a multi-electrode electrical discharge machining power supply so that an excessive current through any one of the power switches is interrupted without affecting the operation of the others. Another detailed object is to provide a current cut-off circuit which may be employed to provide a step-like reduction in the current flow through an ionized gap in response to such current flow exceeding a predetermined level.

BRIEF DESCRIPTION OF THE DRAWINGS

Other objects and advantages of the invention will become apparent from the following detailed description when taken in connection with the accompanying drawings, in which:

FIG. 5 shows a modification of the current cut-off circuit of FIG. 4;

FIG. 6 is a circuit diagram of a current cut-off circuit for the reverse polarity power switches;

FIG. 7 is a simplified circuit diagram to illustrate the independent action of the current cut-off circuits when used with the power switches of a multi-electrode power supply such as shown in FIG. 1;

FIG. 8 is a simplified circuit diagram illustrating the use of current cut-off circuits such as shown in FIG. 4 to provide a step-like reduction of the gap current under excessive gap current conditions; and FIGS. 9A, 9B, 9C and 9D are a diagram of gap current vs. time to show the step-like gap current reduction provided by the circuit of FIG. 8.

DESCRIPTION OF THE ILLUSTRATED EMBODIMENT

General

While the invention will be described in connection with an illustrated embodiment, it will be understood that there is no intent to limit it to that embodiment. To the contrary, the intent is to cover all alternatives, modifications and equivalents as may be included within the spirit and scope of the invention as defined by the appended claims.

Figure 1:
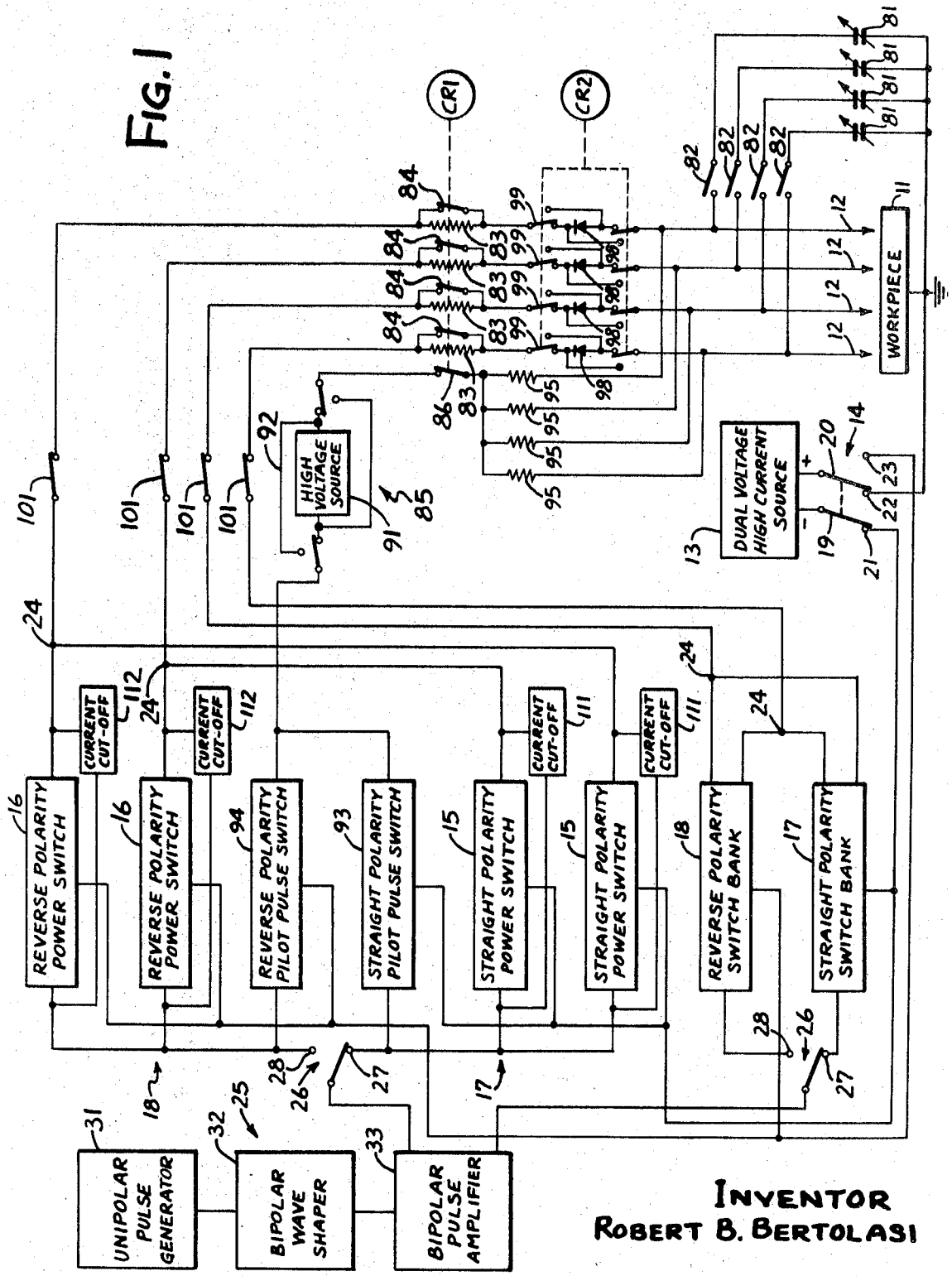
FIG. 1 is a simplified block diagram of a multi-electrode electrical discharge machining power supply constructed in accordance with the present invention.

Turning now to the drawings, and particularly to FIG. 1, there is shown a multi-electrode power supply for electrical discharge-type machining of a workpiece 11 by providing successions of time-spaced electrical discharges or sparks through a plurality of ionizable gaps, each of which is defined between a respective one of the electrodes 12 and the workpiece 11. In keeping with the general practice in the art, to provide an ionizable medium capable of carrying high energy discharges and of rapidly quenching such discharges, the gaps are filled with a dielectric fluid (not shown). This fluid is preferably circulated to remove dislodged particles from the gap areas and to provide cooling of the workpiece.

Polarity selection

In accordance with an important feature of the present invention, provision is made to enable the operator to selectively polarize the power supply for either straight or reverse polarity machining of the workpiece 11, and the polarity selection is effected while maintaining the workpiece 11 at a fixed reference potential, say ground potential. This arrangement may be employed with single-electrode equipment. However, its major advantages are realized in connection with multi-electrode power supplies since such supplies are most frequently used to machine a single, electrically continuous workpiece 11 and the alternative polarity reversing method, i.e., interchanging the electrode and workpiece connections, is then not available.

In carrying out this feature, it is economically desirable that the same D.C. power or high current source 13 be used for both straight and reverse polarity operation. Accordingly, there is a polarity reversing switch 14 for selectively polarizing the force 13 relative to the workpiece 11 and the electrodes 12. Further, for each of the electrodes 12, there is a pair of oppositely polarized power switches 15 and 16, one for straight polarity machining and the other for reverse polarity machining. The power switches 15 and 16 are preferably electronic, each with a control circuit and a power circuit, and to simplify the change from one machining polarity to the other, they may be collected with other switches of like polarity in straight and reverse polarity switch banks 17 and 18, respectively.

To provide effective multi-electrode machining of the workpiece 11, it is necessary that the different electrode-to-workpiece gaps be electrically isolated from one another. Thus, where the workpiece is a single, electrically continuous member as shown, isolation must be maintained between the electrodes 12. For this reason, in the illustrated embodiment, the polarity reversing switch 14 maintains the workpiece 11 at a fixed reference potential regardless of the polarity selected and completes a circuit between the source 13 and each of the electrodes 12 through the power circuit of either the straight or reverse polarity power switch provided for that electrode. The resulting impedance between the power source 13 and each of the electrodes 12 maintains the electrodes electrically isolated from one another.

A suitable reversing switch 14 is shown by way of example to have a pair of ganged contact blades 19 and 20 and three contact terminals 21, 22 and 23. The blades 19 and 20 are respectively connected to the negative and positive sides of the source 13, while the terminals 21, 22 and 23 are respectively connected to a common end of the power circuits of the straight polarity power switches 15, the workpiece 11, and a common end of the power circuits of the reverse polarity power switches 16. The other ends of the power circuits of each of the pairs of power switches are connected at a terminal 24 to one another and, from there, to the electrode 12 served by that switch pair.

From the foregoing, it will be appreciated that the selection of the machining polarity is readily effected by simply moving the switch blades 19 and 20 into contact with the terminals 21 and 22 for straight polarity machining or the terminals 22 and 23 for reverse polarity machining. Moreover, it will be seen that, regardless of the polarity selected, the workpiece 11 is tied directly, i.e., through a lead that offers a substantially constant impedance, to one side of the source 13; the positive side for straight polarity machining and the negative side for reverse polarity machining, so as to remain at a fixed reference potential. By referring to the workpiece as being maintained at a fixed reference potential, it is intended to contrast the manner in which a polarity reversal is obtained according to the present invention with the situation that would exist if a polarity reversal was attempted to interchanging the electrode and workpiece connections. In this latter case, it will be seen, that for one machining polarity the power switches would be disposed between the power source 13 and the workpiece 11 while the electrodes 12 would be substantially short circuited to one another. The result, of course, is that there would be no isolation between the different gaps and an inoperative situation would exist.

To provide the energy from the source 13 to the electrodes 12 in a series of pulses, as is conventional in the art, successions of control pulses are applied to the control circuits of the selected polarity power switches to intermittently switch the power circuits thereof from non-conductive to conductive states. Preferably, the control pulses for both machining polarities are generated by a single pulse generator 25 and selectively applied to the control circuits of the straight and reverse polarity power switches by selector switches 26.

Figure 2:
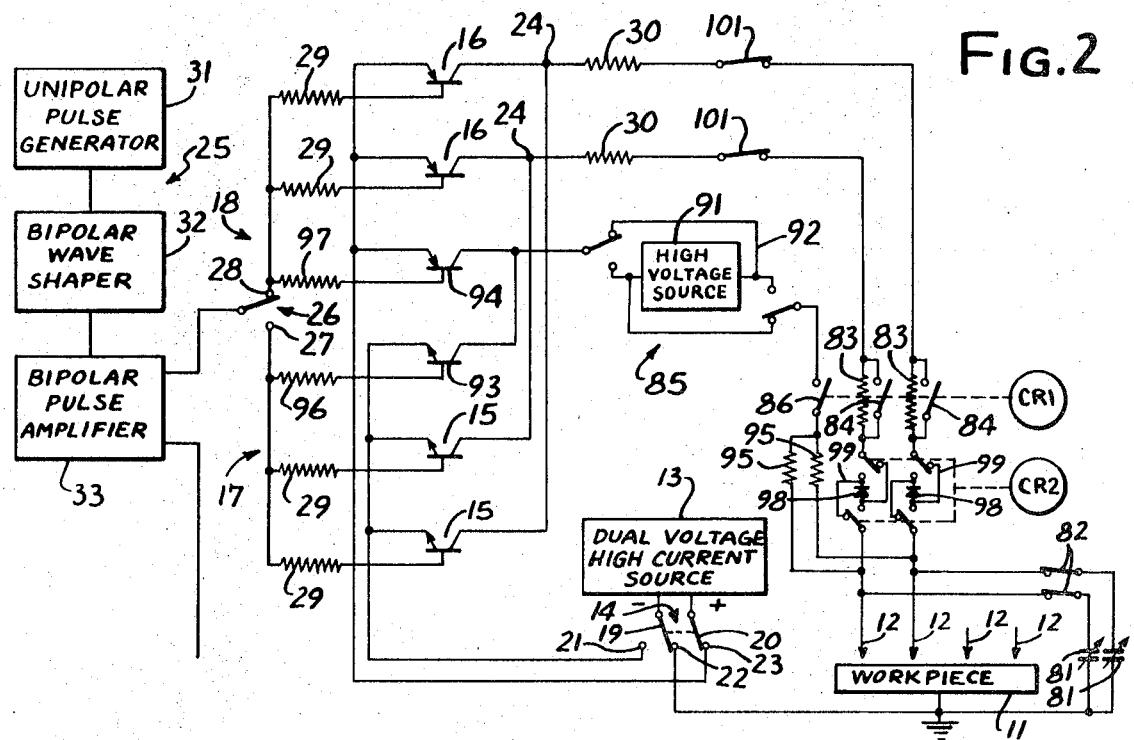
FIG. 2 is a circuit diagram illustrating a portion of the power supply of FIG. 1 in more detail.

Referring now to FIG. 2, wherein one bank of both straight and reverse polarity switches is shown, the oppositely polarized power switches provided for each of the electrodes 12 may suitably be a pair of complementary transistors; a NPN-type as the straight polarity power switch 15 and a PNP-type as the reverse polarity power switch 16. As shown, the transistors 15 and 16 are connected in common emitter configuration such that current flow between the source 13 and the electrodes 12 is carried through the collector-emitter power circuits of the transistors 15 during straight polarity machining and of the transistors 16 during reverse polarity machining. To this end, the emitters of the transistors 15 and 16 are respectively connected to the switch terminals 21 and 23, while the collectors of the transistors 15 are each connected at a respective one of the terminals 24 to the collector of a respective one of the transistors 16. To receive the control pulses provided by the generator 25, the bases of the transistors 15 are connected to one terminal 27 of the selector switch 26 and the bases of the transistors 16 are connected to the other terminal 28. In keeping with accepted practice, to protect the transistors and to isolate the control circuits thereof from one another, these connections may be made through respective current limiting resistors 29.

With this embodiment, to permit the use of a single control pulse generator for both straight and reverse polarity machining, the pulse generator 25 is of the type that applies bipolar control pulses to the selector switch 26. Moreover, to minimize the dissipation ratings required for the transistors 15 and 16, and to thereby permit the use of relatively inexpensive power transistors, the control pulses provided are preferably of sufficient magnitude to switch the collector-emitter power circuits thereof between a non-conductive state and a state of saturated conduction.

An advantage of using complementary transistors as the power switches and of providing bipolar control pulses for switching these is that the discharge duty cycle for one maching polarity is inherently substantially the complement of that for the other. For example, say the positive portions of the control pulses have a 10% duty cycle, the negative portions inherently have close to a 90% duty cycle. Thus, with these pulses applied to the bases of the straight polarity transistors 15, the discharge duty cycle is about 10%, whereas with them applied to the bases of the reverse polarity transistors 16, the discharge duty cycle is approximately 90%. The import of this can be appreciated by considering that, as a general rule, the useful discharge duty cycle for straight polarity machining is between 10 and 50% and for reverse polarity machining between 50 and 90%. Thus, for many purposes, the full range of desired discharge duty cycles for straight and reverse polarity machining may be provided by a bipolar pulse generator 25 which has a duty cycle that is variable over a range of only 40%. However, it should be noted that in some instances it is desirable to have a wider range of available discharge duty cycles, say 10 to 90%, for both straight and reverse polarity machining, and the pulse generator 25 then has a corresponding broader range of available duty cycles.

To provide substantially equal metal removal rates and to permit the distances between the respective electrodes 12 and the workpiece 11, in other words the gap spacings, to be readily controlled by servo means (not shown) of the type commonly employed in the art, it is desirable that the gap discharges be of substantially equal power. For this reason, to reduce the effect of the differences that may exist among the various NPN transistors 15 and the various PNP transistors 16, between each of the electrodes 12 and terminals 24 there is a balancing resistor 30. These resistors are all substantially identical and are of a value that is large compared to the collector-emitter resistance of the transistors when the transistors are in a state of saturated conduction. For this same reason, the bipolar pulse generator 25 is preferably designed to apply substantially identical control pulses to each of the selector switches 26.

The bipolar pulse generator 25 may take a variety of forms. By way of example, a suitable generator is shown to comprise a unipolar pulse generator 31, a bipolar wave shaper 32 for converting the unipolar output of the generator 31 to bipolar pulses, and a bipolar pulse amplifier 33 for applying amplified bipolar control pulses to each of the selector switches 26. With this arrangement, to permit variation of the discharge frequency and duty cycle as required for optimum performance, the unipolar generator 31 is preferably of the type that has a variable output frequency and duty cycle.

Figure 3:
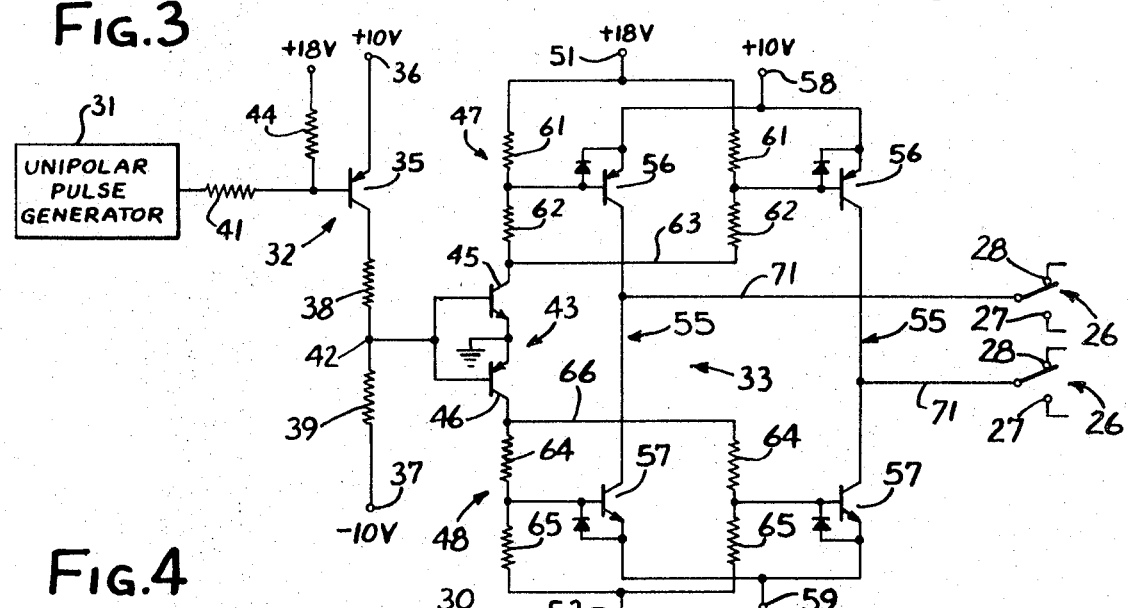
FIG. 3 is a circuit diagram showing a bipolar pulse shaper and amplifier suitable for driving the transistor power switches of FIG. 2.

In the interest of completeness, a particular bipolar wave shaper 32 and amplifier 33, such as may be used with the illustrated embodiment, are shown in FIG. 3, it being understood that such showing is merely exemplary.

As can be seen, to convert the unipolar pulses provided by the generator 31 to bipolar form, the wave shaper 32 comprises a transistor 35 which has its collector-emitter circuit connected between a pair of oppositely biased terminals 36 and 37 through a pair of resistors 38 and 39 and its base connected to receive the unipolar pulses through a series current limiting resistor 41. Between the resistors 38 and 39 there is a terminal 42 which is connected to ground through the input stage 43 of the amplifier 33 and through which current is caused to flow in one direction during each of the unipolar pulses and in the other direction between such pulses to thereby form the desired bipolar pulses. To this end, a positive bias is applied to the terminal 36 and a negative bias is applied to the terminal 37. Further, the base-emitter circuit of the transistor 35 is biased by the current flow through a biasing resistor 44 so that its collector-emitter circuit switches from a non-conductive to a conductive state in response to each of the pulses provided by the generator 31. Thus, when a pulse is applied to the base of the transistor 35 by the generator 31, current flows from the terminal 36 to ground. On the other hand, between pulses from the generator 31, current flows from ground to the terminal 37. The resistors 38 and 39 are selected so that equal amounts of current flow in both directions between the terminal 42 and ground to thereby provide balanced bipolar pulses.

The amplifier 33 shown separates the positive and negative-going portions of the bipolar pulses, amplifies the separated portions, and then recombines them for application to the selector switches 26.

The separation is effected at the amplifier input stage 43. For this purpose, it is formed by a pair of complementary transistors, a NPN-type 45 and a PNP-type 46, which are connected in a double ended, push-pull configuration. Specifically, the transistors 45 and 46 have their base-emitter circuits connected in parallel between the terminal 42 and ground and their collectors connected through load circuits 47 and 48 to terminals 51 and 52, respectively. A positive bias is applied to the terminal 51, while an equal and opposite negative bias is applied to the terminal 52. Accordingly, the positive-going portion of each pulse provided by the wave shaper 32 appears with a 180° phase shift at the collector of the transistor 45, while the negative-going portion of each appears with a like phase shift at the collector of the transistor 46.

To amplify the separated portions of the bipolar pulses, substantially identical amplifying stages 55, one for each of the selector switches 26, are provided. These stages each include a PNP-type transistor 56 for amplifying the positive-going pulse portions and a NPN-type transistor 57 for amplifying the negative-going portions. The emitters of the transistors 56 are connected to a terminal 58 to which a positive bias is applied, while the emitters of the transistors 57 are connected to a terminal 59 to which a negative bias is applied. Preferably to supply balanced bipolar control pulses to the selector switches 26, the biases applied to the terminals 58 and 59 are balanced.

The transistors 56 and 57 are alternatively biased on by the current drawn by the transistors 45 and 46, respectively. To most efficiently use this current, the base of each of the transistors 56 is connected intermediate a pair of bias resistors 61 and 62 which, in turn, are connected between the bias terminal 51 and the collector of the transistor 45. The bias resistor pairs for the different PNP transistors 56 are connected in parallel with one another by a positive distribution line 63 to form the load circuit 47. Similarly, the base of each of the transistors 57 is connected intermediate a pair of bias resistors 64 and 65 which, in turn, are connected between the bias terminal 59 and the collector of the transistor 46, and the bias resistor pairs for the different NPN transistors 57 are connected in parallel with one another by a negative distribution line 66 to form the load circuit 48.

In each of the amplifying stages 55, to recombine the amplified positive and negative portions of the bipolar pulses, the collectors of the transistors 56 and 57 are connected together and through a lead 71 to a respective one of the selector switches 26. By proper selection of these transistors, the timing for each of the stages 55 can be such that the turn "on" of one of the transistors corresponds with the turn "off" of the other. As a result, the control pulses applied to each of the selector switches 26 appear as smooth, rapid excursions from the potential applied to one of the terminals 58 and 59 to the potential applied to the other. To most efficiently supply control pulses which are of sufficient magnitude to switch the power circuits of the selected polarity power switches 15 or 16 between non-conductive states and states of saturated conduction, the collector-emitter circuits of the transistors 56 and 57 and the leads 71 are preferably free of any lumped impedance. Also, to maintain the pulses applied to the different selector switches 26 in close synchronization, the leads 71 are all preferably of substantially the same length.

Mode selection

In accordance with another important feature of the present invention, provision is made to enable the operator to select either capacitor discharge-type or pulse-type operation as required for optimum machining under any given set of conditions. As a matter of nomenclature, a power supply which is capable of operation in either of these modes may be referred to as a universal electrical discharge machining power supply.

Returning now to FIGS. 1 and 2, for capacitor discharge-type operation, a capacitive storage circuit 81 is provided for each of the electrodes 12, and connected in series with each of the storage circuits 81 there is a switch 82 to enable the operator to selectively connect and disconnect the storage circuit across its electrode 12 and the workpiece 11. Stable operation in this mode requires that the time constants of the storage circuits 81 be selected so that the frequency of the gap discharges provided thereby is matched to the frequency of the power pulses provided through the power circuits of the selected polarity power switches. Preferably, to permit this match to be effected over a range of frequencies, the time constants of the storage circuits 81 are variable, typically by changing the amount of capacitance presented thereby.

Effective capacitor discharge-type operation requires that current flow through the power circuits of the selected polarity power switches 15 or 16 be at a sufficient voltage and power to permit the storage circuits 81 to charge to the relatively high level necessary to ionize the gaps in a relatively short time. However, the addition of capacitance to the electrode-workpiece circuits that accompanies operation in this mode has an intensifying effect on the power of the discharges that are passed through the respective gaps. This follows from the fact that the magnitude of the peak discharge currents provided by the storage circuits 81 may be much greater than the magnitude of the charging currents applied thereto. Accordingly, for operation in this mode, to limit the dissipation ratings required of the transistors 15 and 16, respective current limiting resistors 83 may be connected between each of the terminals 24 and the storage circuits 81.

On the other hand, in pulse-type operation, a separate pilot pulse circuit 85 may be employed to provide the high voltage pulses necessary to ionize the gaps. This permits utilization of lower voltage power pulses whereby the current level of the power pulses can be increased without requiring an increased dissipation rating for the power switches. For this reason, the power source 13 is preferably of a dual output voltage-type having a relatively high output voltage, say 125 volts, for capacitor discharge-type operation and a relatively low output voltage, say 50 volts, for pulse-type operation. Moreover, across each of the current limiting resistors 83 there is a shorting switch 84 which is opened for capacitor discharge-type operation and closed for pulse-type operation. Further, there is a switch 86 for selectively connecting and disconnecting the pilot pulse circuit 85 across the electrodes 12 and the workpiece 11. Conveniently, the shorting switches 84 and the pilot pulse circuit disconnect switch 86 may be controlled by a common relay CR1.

For effective ionization of the electrode-to-workpiece gaps during both straight and reverse polarity operation, provision is made for the pilot pulse circuit 85 to apply across the electrodes 12 and workpiece 11 high voltage, gap ionizing pulses which are synchronized with and which correspond in polarity to the power pulses applied thereacross by the selected polarity power switches 15 or 16. In keeping with the present invention, this is preferably done with a single, high voltage source 91. As shown, the pilot pulse circuit 85, therefore, comprises a polarity reversing switch 92 for selectively polarizing the high voltage source 91 and a pair of oppositely polarized pilot pulse switches 93 and 94 for intermittently coupling the high voltage source across the electrodes 12 and the workpiece 11 during straight and reverse polarity pulse-type operation, respectively. The pilot pulse switches 93 and 94, which respectively correspond in polarization with the straight and reverse polarity power switches 15 and 16, are typically a pair of complementary transistors; the switch 93 a NPN-type transistor and the switch 94 a PNP-type.

For providing high voltage pulses of the required polarity, the polarity reversing switch 92 is set, either manually or remotely, to properly polarize the high voltage source 91, and the source 91 is connected in series with the collector-emitter power circuit of the selected polarity one of the transistors 93 or 94. The power circuit of this transistor is then switched, in synchronization with the power circuits of the correspondingly polarized power switches, from a substantially non-conductive state to a conductive state, preferably a state of saturated conduction, in response to each of a succession of control pulses applied to the base thereof. Conveniently, the synchronized switching of the correspondingly polarized pilot pulse and power switches is obtained by connecting the control circuits thereof in parallel to receive control pulses from the source 25. As shown, the base of the transistor 93 is, therefore, connected through a current limiting resistor 96 in parallel with the bases of the transistors 15, and these in turn are connected to the terminal 27 of one of the selector switches 26. Similarly, the base of the transistor 94 is connected through a current limiting resistor 97 in parallel with the bases of the transistors 16, and these are connected to the selector switch terminal 28.

To minimize the output voltage required of the high voltage source 91, the output of the current source 13 may advantageously be connected in voltage aiding relationship therewith during pulse-type operation. For this reason, and to insure that the output of the high voltage source 91 is connected in series with the collector-emitter circuit of the proper one of the transistors 93 and 94 for a given polarity operation, the emitters of the transistors 93 and 94 are respectively connected to the reversing switch terminals 21 and 23 and their collectors are connected to one another and to the high voltage source 91. To limit the current drawn through the collector-emitter circuits of the transistors 93 and 94, connected in series between the high voltage source 91 and each of the electrodes 12 there is a current limiting resistor 95.

Generally, the gaps ionize only after a high voltage has existed across them for some finite time, a time that varies from gap-to-gap and discharge-to-discharge. Hence, for pulse-type operation, to prevent the high voltage pilot pulses from being attenuated through the power circuits of the selected polarity power switches, and to protect these power circuits from having the high voltage of the pilot pulses impressed thereacross, unidirectional conducting means, typically diodes 98, are provided to prevent current flow through these circuits until after the gaps have ionized. In the illustrated embodiment, and in keeping with the objective of economizing where possible, each pair of oppositely polarized power switches 15 and 16 is served by a single diode, and this diode is selectively poled for straight and reverse polarity operation by a polarity reversing switch 99. For this reason, each of the diodes 98 is connected between a respective one of the electrodes 12 and the common terminal 24 of the power circuits of the power switches for that electrode. Conveniently, the polarity reversing switches 99 may all be operated by a control relay CR2.

It should be noted that whereas the pilot pulses are commonly employed merely to ionize the gaps and power pulses are passed by the selected polarity one of the power switches 15 or 16 to provide the discharge energy, advantage may be taken of the relatively low current level typical of the pilot pulses to provide very low power discharges such as required where an extremely fine surface finish is desired. Therefore, to permit the use of the pilot pulses alone, for each of the electrodes 12 there is a switch 101 which may be opened to disconnect the power circuits of the power switches 15 and 16 therefrom.

Also, whereas in the illustrated embodiment only one pilot pulse circuit 85 is provided, and this is utilized to apply high voltage pulses across each of the electrodes 12 and the workpiece 11, it is to be understood that in some instances, such as where there is a large number of electrodes 12, more than one circuit of this type may be employed.

Current cut-off

Another important aspect of the present invention is that an excessive current flow through the power circuit of any one of the power switches 15 and 16 is interrupted to protect them and the workpiece 11 from the potentially damaging effects thereof, and this is done without affecting the operation of the other power switches whereby time consuming complete shut-downs of the entire power supply are avoided. To obtain this independent action, each of the power switches 15 and 16 is provided with a current cut-off circuit; the cut-off circuits for the straight and reverse polarity power switches being indicated generally by 111 and 112, respectively.

Figure 4:
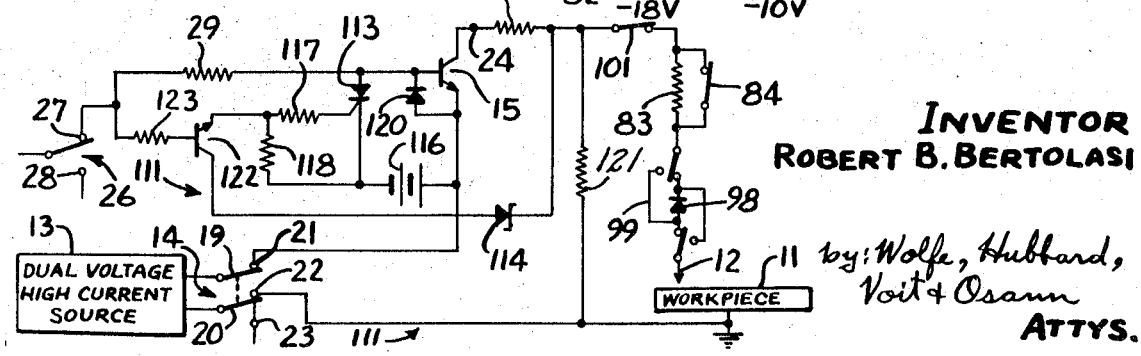
FIG. 4 is a circuit diagram of a current cut-off circuit for the straight polarity power switches.

Referring to FIG. 4 wherein a specific embodiment of the cut-off circuit 111 is shown, it will be seen that, broadly stated, it includes a switching device 113, which is connected across the base-emitter control circuit of the transistor 15, and a threshold detecting means 114, which is connected between the collector of the transistor and the switching device. Under normal operating conditions, the switching device 113 is in a high impedance, non-conductive state or open circuit condition in which it presents a high impedance path to the control pulses. However, in response to the current flow through the power circuit of the transistor 15 rising above a predetermined level, the switching device 113 is switched to a very low impedance, conductive state by a signal supplied by the threshold detecting means 114, and it then presents a substantially short circuit shunt path across the control circuit of the transistor 15 thereby causing the power circuit thereof to immediately revert to its non-conductive state.

As shown, the switching device 113 is a silicon-controlled-rectifier. However, it is to be understood that other devices, preferably with similar latching and reset characteristics, such as Thyratrons, latching relays and the like, can be used. Further, while the threshold detecting means 114 shown is a Zener diode, it is to be understood that other devices with similar threshold detecting capabilities can be employed.

Considering the illustrated straight polarity current cut-off circuit 111 in more detail, it will be seen that the anode and cathode of the silicon-controlled-rectifier 113 are respectively connected to the base and emitter of the transistor 15 so as to be poled for forward conduction of the positive-going portions of the control pulses; i.e., the portions during which the collector-emitter circuit of the transistor 15 is normally in its conductive state. To insure that the control circuit of the transistor 15 is reversed biased when the silicon-controlled-rectifier is fired, connected between the cathode of the rectifier 113 and the emitter of the transistor 15 there is a reverse bias source 116. Moreover, to protect the base-emitter junction of the transistor 15, and to insure that the rectifier 113 is turned-off during the negative-going portions of the control pulses, connected across the base-emitter circuit of the transistor 15 there is a diode 120. The diode 120 is poled for forward conduction of the negative-going control pulse portions, and is selected to itself, or in combination with additional impedance, provide a forward voltage drop exceeding the voltage of the bias source 116.

To detect an excessive current flow through the power circuit of the transistor 15, the Zener diode 114 is poled to be back biased by the voltage developed across the series combination of the collector-emitter circuit of the transistor and the balancing resistor 30, and is selected so that its reverse breakdown potential is exceeded by the back bias applied thereacross when the current flow through the collector-emitter circuit of the transistor 15 rises above a predetermined level. In this instance, the direction of the reverse current flow through the diode 114 is such as to forward bias the gate-cathode circuit of the silicon-controlled-rectifier 113. Therefore, to be poled as aforesaid and to supply a firing signal to the rectifier 113 when the current flow through the collector-emitter circuit of the transistor 15 rises above the predetermined level, the Zener diode 114 has its cathode connected intermediate the balancing resistor 30 and the switch 101 and its anode connected through a series current limiting resistor 117 to the gate of the silicon-controlled-rectifier 113. A resistor 118 may be connected across the current limiting resistor 117 and the gate-cathode circuit of the rectifier 113 to suppress spurious signals that may occur.

As will be appreciated, the delay between the time an excessive current begins to flow in the power circuit of the transistor 15 and the time the silicon-controlled-rectifier 113 is fired is negligible compared to the duration of the discharges. Accordingly, there is a per-pulse current cut-off action. Moreover, since the anode-cathode circuit of the rectifier 113 latches in its conductive state once fired for the remaining part of any existing positive-going control pulse portion and resets to its non-conductive state upon the succeeding negative-going control pulse portion, the cut-off action is such as to insure that the collector-emitter circuit of the transistor 15 is held in its non-conductive state throughout the remaining part of the existing positive-going pulse and is then again switched to its state of saturated conduction in response to the next positive-going pulse. In other words, there is no risk of only a partial cut-off occurring, i.e., a situation wherein the collector-emitter circuit of the transistor 15 would be partially conductive. Further the current cut-off circuit is automatically resetting so that the transistor 15 again passes full machining pulses as soon as the condition which caused the excessive current to flow is cleared.

Turning now to FIG. 6, the current cut-off circuit 112 provided for the reverse polarity power switches 16 is basically the same as the previously described cut-off circuit 111, with the major difference being that it is necessary to reverse the polarization of the circuit to accommodate this opposite polarity situation. That is, the anode and cathode of the silicon-controlled-rectifier 113' are respectively connected to the emitter and base of the power transistor 16 so as to be poled for forward conduction of the negative-going control pulse portions; i.e., the portions during which the collector-emitter circuit of the transistor 16 is normally in its conductive state. Further, connected between the emitter of the transistor 16 and the anode of the rectifier 113' there is a bias source 116' to insure that the base-emitter control circuit of the transistor 16 is reversed biased when the rectifier 113' is fired. Also, to protect the base-emitter junction of the transistor 16, and to insure that the rectifier 113' is turned-off during the positive-going control pulse portions, connected across the base-emitter circuit of the transistor 16 there is a diode 120'. The diode 120' is poled for forward conduction of the positive-going control pulse portions and is selected to itself, or in combination with additional impedance, provide a forward voltage drop exceeding the voltage of the bias source 116'.

The Zener diode 114' is poled to be back biased by the voltage developed across the series combination of the collector-emitter circuit of the transistor 16 and the balancing resistor 30, and is selected to have a reverse breakdown potential that is exceeded by the reverse bias applied thereacross when the current flow through the collector-emitter circuit of the transistor 16 rises above the predetermined level. However, in this instance, the reverse current flow through the diode 114' is in the direction opposite to that necessary to forward bias the gate-cathode circuit of the rectifier 113'. Therefore, to be poled as aforesaid and to supply a firing signal to the rectifier 113' when the current flow through the collector-emitter of the transistor 16 rises above the predetermined level, the Zener diode 114' has its anode connected intermediate the balancing resistor 30 and the switch 101 and its cathode connected to the base of a polarity reversing PNP transistor 119. Transistor 119, in turn, has its emitter connected to the positive terminal of the bias source 116' and its collector connected to the gate of the silicon-controlled-rectifier 113' through the current limiting resistor 117'.

In some situations, particularly for pulse-type operation, it is desirable that there be a path for idle current flow through the power circuit of each of the selected polarity power switches; i.e., a current flow occurring after the power circuit has been switched to its conductive state and before the gap associated therewith has ionized. Preferably, each pair of oppositely polarized power switches 15 and 16 is served by a single idle current path, and this path is further effective to drain any charge stored by the power switch pair and by the isolating diode 98 for that pair. Therefore, as shown in FIGS. 4 and 6 for the case of one pair of power switches 15 and 16, such showing being typical of the provision that may be made for the other pairs, there is a resistor 121 which is connected at one end intermediate the balancing resistor 30 and the switch 101 and at the other end to the grounded workpiece 11.

As will be appreciated with an idle current path such as the resistor 121, when the power circuit of the selected polarity one of the power switches 15 and 16 is in its non-conductive state, substantially the full output voltage of the current source 13 appears thereacross. The result, of course, is that the Zener diode in the current cut-off circuit for that power switch is strongly back or reverse biased just as though an excessive current condition existed. Accordingly, in each of the current cut-off circuits, to prevent false firing of the silicon-controlled-rectifier, there is a gating means which is connected in series with the Zener diode and which is opened and closed in synchronization with the switching of the power circuit of the associated power switch between its non-conductive and conductive states. The synchronization is such that the gating means is closed to permit current flow through the Zener diode only when the power circuit of the associated power switch is in its conductive state.

Advantageously, the gating means may be a transistor which is of the same type as the associated power switch. This permits the gating action to be effected by switching the collector-emitter output circuit of the transistor between a non-conductive and a conductive stage, and the synchronization to be obtained by connecting the base-emitter input circuit thereof in parallel with the control circuit of the associated power switch to receive control pulses from the generator 25.

Thus, in the case of the straight polarity current cut-off circuit 111 shown in FIG. 4, the gating means is a NPN transistor 122 which has its collector connected to the anode of the Zener diode 114 and its emitter connected to the gate of the silicon-controlled-rectifier 113 through the current limiting resistor 117. The base of the gating transistor 122 is connected in parallel with the base of the transistor 15 through a current limiting resistor 123. On the other hand, in the reverse polarity current cut-offs circuit 112 shown in FIG. 6, the gating means is a PNP transistor 122' which has its collector connected to the cathode of the Zener diode 114' and its emitter connected to the base of the polarity reversing transistor 119. The base of the gating transistor 122' is connected in parallel with the base of the reverse polarity transistor power switch 16 through the current limiting resistor 123'.

As can be seen, in the case of the reverse polarity cut-off circuit 112, the forward bias current for the base-emitter junction of the gating transistor 122' is in a direction such as to forward bias the base-emitter junction of the polarity reversing transistor 119. Therefore, to prevent this relatively low level bias current from causing a false firing of the silicon-controlled-rectifier 113', connected between the base of the transistor 119 and emitter of the transistor 122' there is a diode 124 which is poled in the same direction as the base-emitter junctions of the transistors 119 and 122' and which is selected to have a sufficient forward offset voltage to block the base-emitter bias current for the transistor 122'. Further, connected between the emitter of the transistor 122' and the positive terminal of the bias source 116' there is a resistor 125 to provide an alternative path for this bias current. There is no similar problem in the straight polarity cut-off circuit 111 and, therefore, no similar provision need be made therein.

Turning now to FIG. 5, the current cut-off circuits may be designed so as to not respond to an excessive current condition during a predetermined first portion of each of the power pulses or to respond to such a condition only after a predetermined delay. The provisions made to afford this action are illustrated in connection with the straight polarity current cut-off circuit 111, but it will be understood that they are equally applicable to the reverse polarity cut-off circuit 112.

In electrical discharge machining of certain metals, such as cast iron, the leading edge of the discharge is in the form of a high current spike. This spike is short enough in duration that it has no damaging effect and, therefore, it is desirable to maintain the current cut-off circuits in a disabled condition during this first portion of the discharge. This may be done, for example, by inserting a delay circuit 126 in the base-emitter input circuit of the transistor 122 to delay the application of the control pulses thereto.

Also, in some instances, such as where there is a tendency for debris to collect in the gap areas and to therefore bridge the spacings between the electrodes 12 and the workpiece 11, it is advantageous to permit a high current to flow through the gaps for a short time in order that any debris bridge may be burned away. This type of action may be obtained by inserting an integrating-type delay circuit 127 between the Zener diode 114 and the silicon-controlled-rectifier 113.

It will be appreciated that the current cut-off circuits 111 and 112 are effective to interrupt an excessive current flow through any one of the power switches without affecting the operation of the others. For example, referring to FIG. 7, assuming that the current flow through the collector-emitter circuit of the upper one of the illustrated straight polarity transistor power switches 15 rises above the predetermined threshold level, the current cut-off circuit 111 for that switch is activated. Specifically, the back bias applied across its Zener diode 114 exceeds the reverse breakdown potential thereof, thereby causing a reverse current to flow through the diode. This current, in turn, causes the silicon-controlled-rectifier 113 of the upper cut-off circuit 111 to fire thereby applying the cut-off bias provided by the bias source 116 across the base-emitter circuit of the upper transistor. But, at the same time, the lower transistor 15 and its current cut-off circuit 111 are unaffected, with the result that machining of the workpiece 11 can continue.

Turning now to FIG. 8, it will be appreciated that to provide an increased power handling capacity, each of the power switches 15 and 16 may comprise a bank of parallel connected switches, such as the NPN transistors 15a, 15b and 15c shown for the case of a straight polarity power switch. In this way, only a portion of the total current flow between the source 13 and one of the electrodes 12 is carried by any one of the transistors. For this purpose, as shown, the transistors 15a, 15b and 15c have their bases connected through respective current limiting resistors 29a, 29b and 29c to the terminal 27 of one of the polarity selector switches 26, and their collector-emitter circuits connected through respective balancing resistors 30a, 30b and 30c between the power source 13 and one of the electrodes 12.

With a power switch of this type, adequate overcurrent protection may be afforded by employing a single current cut-off circuit to open or turn-off all of the parallel connected switches whenever the total current flow or the current flow through any one of them exceeds a predetermined threshold level. The manner in which this may be effected for either a straight or reverse polarity power switch is readily apparent from the foregoing discussion relating to FIGS. 4-7 and, therefore, need not be described further.

However, in keeping with one of the more detailed aspects of the present invention, the independent action of the current cut-off circuits may be utilized to provide an operation in which the current flow through different ones of the parallel connected switches 15a, 15b and 15c is interrupted at different threshold levels. That is, by providing each portion of one or more of the parallel connected switches with a respective current cut-off circuit, and by selecting different threshold levels for activation of the different current cut-off circuits, the current flow through the output circuits of the various portion of the parallel connected switches may be interrupted at respective increasingly higher threshold levels.

For example, referring to FIG. 8 and FIGS. 9A-9D, each of the parallel connected transistor switches 15a, 15b and 15c may be provided with a respective current cut-off circuit 111a, 111b and 111c. As shown, the cut-off circuits 111a, 111b and 111c are each substantially identical to the previously described cut-off circuit 111 and, therefore similar reference characters are used to identify the various components, with the exception that the letters a, b and c have been added to distinguish the components of one circuit from the like components of the others.

To carry out this feature of the invention, the Zener diodes 114a, 114b and 114c are selected to have respective reverse breakdown potentials that are exceeded by the reverse or back bias applied thereacross at increasingly higher levels of current flow through the output circuits of the transistors 15a, 15b and 15c, respectively. As shown, these threshold levels may be $I_1$, $I_2$, and $I_3$, respectively.

Accordingly, with this arrangement, as the total current begins to rise at the time $T_1$, each of the transistors 15a, 15b and 15c carries a portion of the increased current until the time $T_2$. At that time, the threshold level $I_1$ is exceeded and the cut-off circuit 111a is activated. As a result only the transistors 115b and 115c remain to split the total current flow. From the time $T_2$, and as the current again begins to increase at the time $T_3$, and until the threshold level $I_2$ is exceeded at the time $T_4$, the total current flow is divided between the transistors 15b and 15c. At the time $T_4$ the cut-off circuit 111b is activated, leaving only the transistor 15c to carry the total current. Therefore, from the time $T_4$, past the time $T_5$ when the total current once again begins to increase, and until the time $T_6$ when the total current exceeds the threshold level $I_3$, the complete current is carried by the transistor 15c. Finally, at the time $T_6$, the final cut-off circuit 111c is activated and the circuit between the source 13 and the electrode 12 is completely opened.

It should be noted that, as illustrated, the threshold levels $I_1$, $I_2$ and $I_3$ are preferably selected so that after each of these is exceeded, there is a reduction in the maximum total current that can be carried by the switches that continue to conduct. In other words, if activation of either the cut-off circuit 111a or 111b is not accompanied by a reduction in the total current flow, there is an unstable situation and the next current cut-off circuit is activated. In this way, all of the transistors 15a, 15b and 15c may be operated under normal conditions at close to their peak power dissipation ratings; the power supply and the workpiece are fully protected against sustained excessively high and potentially damaging currents; and, in many instances, sufficient current is provided under an overcurrent condition to burn away the condition causing the excessive current to be drawn. More specifically, should a condition occur, such as a dead short circuit between the workpiece 11 and the electrode 12, which can be cleared only by separating the workpiece and electrode, the cut-off circuits are all practically simultaneously activated so that the current flow is quickly interrupted. On the other hand, should a condition occur, such as a debris bridge between the workpiece 11 and electrode 12, which may be cleared in some instances by a continued current flow without damage to the workpiece or power supply, an increasing current is permitted to flow between the times $T_1$ and $T_2$. Moreover, should the condition at least in part clear at the time $T_2$, current continues to flow until the time $T_4$. Similarly, should the condition further clear at the time $T_4$, current again continues to flow, and so on.

As illustrated, the reductions in the maximum permissible level of total current flow are step-like and substantially correspond in times with the points at which the respective current cut-off circuits are activated. However, by providing an integrating-type delay circuit or the like, such as the delay circuit 127 of FIG. 6, in the current cut-off circuits 115b and 115c, the reductions may be more gradual and slightly off-set time-wise from the points at which the threshold levels $I_1$ and $I_2$ are exceeded. In this manner, additional time may be provided for the overcurrent condition to clear itself.

SUMMARY

From the foregoing it will be appreciated that the present invention provides a reversible polarity electrical discharge machining power supply which is operable in a capacitor discharge-type mode or a pulse-type mode for feeding one or more electrodes and wherein a potentially damaging, high current supplied to any one of the electrodes is interrupted without affecting the supply of current to the other electrodes.

I claim as my invention:

1. A reversible polarity electrical discharge machining power supply for providing selectable straight and reverse polarity discharges through one or more ionizable gaps each of which is defined between a respective electrode and a conductive workpiece, said power supply comprising the combination of a power switch means for each of said electrodes, each of said power switch means having one end connected to a respective one of said electrodes and another end; a first polarity reversing means for selectively polarizing a D.C. power source relative to said electrodes and workpieces, said first polarity reversing means coupling the polarized source between the other ends of said power switch means and said workpiece; and control means coupled to intermittently open and close said power switch means whereby successions of selectively polarized power pulses are applied across each of said electrodes and said workpiece.

2. The power supply of claim 1 wherein each of said power switch means includes a pair of oppositely polarized electronic power switches, said power switches each having a control circuit and a power circuit, and said power circuits each having one end coupled in common with one end of the power circuit of an oppositely polarized one of said power switches and to a respective one of said electrodes and another end; said control means includes a selector means for applying a succession of control pulses to the control circuits of the power switches of a selected polarity to thereby intermittently switch the power circuits thereof from non-conductive to conductive states; and said first polarity reversing means couples the polarized power source between the other ends of the power circuits of the selected polarity power switches and the workpiece.

3. The power supply of claim 2 wherein each pair of power switches is a pair of complementary transistors, said transistors each having a collector-emitter power circuit and a base-emitter control circuit; and further including bipolar pulse generating means coupled to said selector means for supplying control pulses of sufficient magnitude to cause the collector-emitter power circuits of the selected polarity power switches to switch between non-conductive states and states of saturated conduction.

4. The power supply of claim 1 further including a capacitive storage circuit for each of said electrodes, at least one pilot pulse means, and switching means to selectively connect each of said storage circuits across a respective one of said electrodes and said workpiece for capacitor discharge-type operation and said pilot pulse means across at least a portion of said electrodes and said workpiece for pulse-type operation, said storage circuits each being effective during capacitor discharge-type operation to charge to a sufficient level to ionize the gap between said one electrode and said workpiece and to thereafter discharge therethrough, and said pilot pulse mean being effective during pulse-type operation to apply high voltage gap ionizing pulses which are synchronized with and correspond in polarity to said power pulses across said portion of said electrodes and said workpiece.

5. The power supply of claim 4 wherein each of said power switch means includes a pair of oppositely polarized electronic power switches, said power switches each having a control circuit and a power circuit, and said power circuits each having one end coupled in common with one end of the power circuit of an oppositely polarized one of said power switches and to a respective one of said electrodes and another end; said first polarity reversing means couples the selectively polarized power source between the other ends of the power circuits of the power switches of a selected polarity and said workpiece; said pilot pulse means includes a pair of oppositely polarized electronic pilot pulse switches and a second polarity reversing means, each of said pilot pulse switches having a control circuit and a power circuit, and said second polarity reversing means selectively polarizing a D.C. high voltage source to correspond in polarization with said power source and connecting said voltage source in series with the power circuit of the pulse switch corresponding in polarization with the selected polarity power switches; and said control means includes a selector means to apply a succession of control pulses to the control circuits of the selected polarity power switches and to the control circuit of the selected polarity pilot pulse switch to thereby intermittently switch the power circuits thereof from non-conductive to conductive states.

6. The power supply of claim 5 wherein said power source has a high output voltage for capacitor discharge-type operation and a low output voltage for pulse-type operation; and further including a unidirectional conducting means for each of said electrodes, and a third polarity reversing means coupled for selectively polling said unidirectional conducting means for straight and reverse polarity operation; each of said unidirectional conducting means being coupled between a respective one of said electrodes and the common ends of the power circuits of the power switches for that electrode and being poled to prevent current flow through the power circuit of the selected polarity one of said power switches during pulse-type operation until the gap defined between that electrode and the workpiece has ionized.

7. The power supply of claim 6 wherein each of said pairs of electronic switches is a pair of complementary transistors, said transistors each having a collector-emitter power circuit and a base-emitter control circuit; and further including a bipolar pulse generator coupled to said selector means for supplying control pulses of sufficient magnitude to switch the power circuits of said selected power switches and the power circuit of said selected pilot pulse switch between non-conductive states and states of saturated conduction, a current limiting means connected in series with the power circuits of each pair of power switches, and a shorting switch connected across each of said current limiting means; each of said shorting switches being opened and closed for capacitor discharge-type and pulse-type operation, respectively.

8. The power supply of claim 5 further including a current cut-off circuit associated with each of said power switches for interrupting an excessive current flow through the power circuit thereof without affecting the operation of the other power switches, each of said current cut-off circuits including a normally non-conductive switching device connected across the control circuit of the associated power switch and a threshold detecting means coupled between the power circuit of said associated power switch and said switching device, said thershold detecting means being responsive when the power circuit of the associated power switch is in its conductive state to the current flow therethrough exceeding a predetermined level to provide a signal for switching said switching device to a conductive state thereby providing substantially a short circuit across the control circuit of said associated power switch and causing the power circuit thereof to revert to its non-conductive state, and said switching device being of the type that is latched when switched to its conductive state and that is thereafter reset to its non-conductive state only when the power circuit of the associated power switch is normally in its non-conductive state.

9. The power supply of claim 8 wherein each of said current cut-off circuits further includes a gating means connected in series with said threshold detecting means, said gating means being opened and closed synchronously with the switching of the power circuit of said associated power switch between its non-conductive and conductive states so that said gating means is closed only when the power circuit of the associated power switch is in its conductive state whereby false switching of said switching device to its conductive state is prevented.

10. The power supply of claim 8 wherein each of said pairs of power switches is a pair of complementary transistors with each of said transistors having a base-emitter control circuit and a collector-emitter power circuit, said control pulses are bipolar each having a positive-going and a negative-going portion, and each of said switching devices is a silicon-controlled-rectifier having an anode-cathode circuit which is connected across the control circuit of the associated power switch and poled for forward conduction of the control pulse portions during which the power circuit of the associated power switch is normally in its conductive state and a gate which is coupled to said threshold detecting means so that said silicon-controlled-rectifier is fired when said current flow exceeds said predetermined level.

11. The power supply of claim 10 wherein each of said current cut-off circuits further includes a gating transistor which is of the same polarity type as the associated transistor power switch, said gating transistor having a collector-emitter output circuit coupled in series with said threshold detecting means and a base-emitter input circuit coupled in parallel with the control circuit of the associated power switch whereby said output circuit is switched from a non-conductive to a conductive state in response to each of said control pulses and synchronously with the power circuit of said associated power switch to thereby prevent false firing of said silicon-controlled-rectifier.

12. The power supply of claim 5 wherein each of said power switches includes a bank of parallel electronic switches, each of said electronic switches having an input circuit connected in parallel with the input circuits of the other switches of said bank to form the control circuit of said power switch and an output circuit connected in parallel with the output circuits of the other switches of said bank to form the power circuit of said power switch, the input circuit of each of said electronic switches being responsive to each of said control pulses to switch the output circuit thereof from a non-conductive to a conductive state; said power supply further including a plurality of current cut-off circuits for each of said banks; each of said current cut-off circuits being associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predetermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conductive state only when the output circuits of the associated switches are normally in their non-conductive states.

13. The power supply of claim 12 wherein said current cut-off circuits have respective increasingly higher threshold levels whereby the current flow through the output circuits of each portion of said switches is interrupted at a level different than the level at which the current flow through the output circuits of the other portions of said switches is interrupted.

14. The power supply of claim 13 wherein said increasingly higher threshold levels are selected so that after each but the highest of them is exceeded there is a reduction in the sum of the currents that can be carried by the output circuits of the switches of said bank that remain in their conductive states without another of said threshold levels being exceeded.

15. The power supply of claim 2 further including a current cut-off circuit associated with each of said power switches for interrupting an excessive current flow through the power circuit thereof without affecting the operation of the other power switches, each of said current cut-off circuits including a normally non-conductive switching device connected across the control circuit of the associated power switch and a threshold detecting means coupled between the power circuit of said associated power switch and said switching device, said threshold detecting means being responsive when the power circuit of the associated power switch is in its conductive state to the current flow therethrough exceeding a predetermined level to provide a signal for switching said switching device to a conductive state thereby providing substantially a short circuit across the control circuit of said associated power switch and causing the power circuit thereof to revert to its non-conductive state, and said switching device being of the type that latches when switched to its conductive state and that thereafter resets to its non-conductive state only during the period that the power circuit of the associated power switch is normally in its non-conductive state.

16. The power supply of claim 15 wherein each of said current cut-off circuits further includes a gating means connected in series with said threshold detecting means, said gating means being opened and closed synchronously with the switching of the power circuit of said associated power switch between its non-conductive and conductive states so that said gating means is closed only when the power circuit of the associated power switch is in its conductive state whereby false switching of said switching device to its conductive state is prevented.

17. The power supply of claim 15 wherein each of said pairs of power switches is a pair of complementary transistors with each of said transistors having a base-emitter control circuit and a collector-emitter power circuit, said control pulses are bipolar each having a positive-going and a negative-going portion, and each of said switching devices is a silicon-controlled-rectifier having an anode-cathode circuit which is connected across the control circuit of the associated power switch and poled for forward conduction of the control pulse portions during which the power circuit of the associated power switch is normally in its conductive state and a gate which is coupled to said threshold detecting means so that said silicon-controlled-rectifier is fired when said current flow exceeds said predetermined level.

18. The power supply of claim 17 wherein each of said current cut-off circuits further includes a gating transistor which is of the same polarity type as the associated transistor power switch, said gating transistor having a collector-emitter output circuit coupled in series with said threshold detecting means and a base-emitter input circuit coupled in parallel with the control circuit of the associated power switch whereby said output circuit is switched from a non-conductive to a conductive state in response to each of said control pulses and synchronously with the power circuit of said associated power switch to thereby prevent false firing of said silicon-controlled-rectifier.

19. The power supply of claim 2 wherein each of said power switches includes a bank of parallel electronic switches, each of said parallel switches having an input circuit connected in parallel with the input circuits of the other electronic switches of said bank to form the control circuit of said power switch and an output circuit connected in parallel with the output circuits of the other electronic switches of said bank to form the power circuit of said power switch, the input circuit of each of said electronic switches being responsive to each of said control pulses to switch the output circuit thereof from a non-conductive to a conductive state; the power supply further including a plurality of current cut-off circuits for each of said banks, each of said current cut-off circuits being associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predetermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conductive state only when the output circuits of the associated switches are normally in their non-conductive states.

20. The power supply of claim 19 wherein said current cut-off circuits have respective increasingly higher threshold levels whereby the current flow through the output circuits of each portion of said switches is interrupted at a level different than the level at which the current flow through the output circuits of the other portions of said switches is interrupted.

21. The power supply of claim 20 wherein said increasingly higher threshold levels are selected so that after each but the highest of them is exceeded there is a reduction in the sum of the currents that can be carried by the output circuits of the switches of said bank that remain in their conductive states without another of said threshold levels being exceeded.

22. In combination with a power switch having a control circuit coupled for receiving a succession of control pulses and a power circuit coupled across a load for passing a power pulse therethrough in response to each of said control pulses, an overcurrent cut-off circuit for interrupting the current flow through said load for the remaining portion of any one of said control pulses in response to said current flow exceeding a predetermined level, said overcurrent cut-off circuit comprising a normally non-conductive switching device coupled across said control circuit for providing a shunt path to said control pulses and a threshold detecting means coupled between said power circuit and said switching device for switching said device to a low impedance conductive state in response to the current flow in said power circuit exceeding said predetermined level, said switching device being of the type that latches when switched to its conductive state for the remaining portion of any existing control pulse and automatically resets to its non-conductive state only after such existing control pulse.

23. The overcurrent cut-off circuit of claim 22 further including a gating switch having an output circuit coupled in series with said threshold detecting means and an input circuit coupled to receive said control pulses, said output circuit being conductive only upon the simultaneous presence of a control pulse in said input circuit and a current flow above said predetermined level in said power circuit whereby false switching of said switching device to its conductive state is prevented.

24. In combination with a bank of parallel electronic switches, each of said switches having an input circut connected in parallel with the input circuits of the other of said electronic switches to receive a succession of control pulses and an output circuit connected in parallel with the output circuits of the other of said electronic switches between a power source and a load, the input circuit of each of said switches being reesponsive to each of said control pulses to switch the output circuit thereof from a non-conductive to a conductive state; a plurality of current cut-off circuits each associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predetermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conductive state only when the output circuits of the associated switches are normally in their non-conductive states.

25. The power supply of claim 24 wherein said current cut-off circuits have respective increasingly higher threshold levels whereby the current flow through the output circuits of each portion of said switches is interrupted at a level different than the level at which the current flow through the output circuits of the other portions of said switches is interrupted.

26. The power supply of claim 25 wherein said increasingly higher threshold levels are selected so that after each but the highest of them is exceeded there is a reduction in the sum of the currents that can be carried by the output circiuts of the switches of said bank that remain in their conductive states without another of said threshold levels being exceeded.

27. In combination with an electrical discharge machining power supply for providing discharges through one or more ionizable gaps each of which is defined between a respective electrode and a conductive workpiece; said power supply including for each electrode a power switch having a power circuit for coupling the electrode to a power source and a control circuit for switching said power circuit from a non-conductive to a conductive state in response to each of a succession of control pulses applied thereto; a current cut-off circuit associated with each of said power switches for interrupting an excessive current flow through the power circuit thereof without affecting the operation of the other power switches; each of said current cut-off circuits comprising a normally non-conductive switching device coupled across the control circuit of the associated power switch and a threshold detecting means coupled between the power circuit of said associated power switch and said switching device, said detecting means being responsive to the current flow in the power circuit of said associated power switch exceeding a predetermined level for supplying a signal to switch said switching device to a conductive state thereby providing substantially a short circuit across the control circuit of the associated power switch to cause the power circuit thereof to revert to its non-conductive state, said switching device being of the type that is latched when switched to its conductive state and that is thereafter automatically reset to its non-conductive state only during the period that the power circuit of the associated power switch is normally in its non-conductive state.

28. The combination of claim 27 further including in each of said current cut-off circuits a gating means connected in series with said threshold detecting means, said gating means being closed only when the power circuit of said associated power switch is in its conductive state to thereby prevent false switching of said switching device to its conductive state.

29. The combination of claim 28 wherein each of said power switches is a transistor having a collector-emitter power circuit and a base-emitter control circuit, said control pulses are of sufficient magnitude to cause each of said power circuits to switch between a non-conductive state and a state of saturated conduction, and each of said switching devices is a silicon-controlled-rectifier having an anode-cathode circuit which is connected across the control circuit of the associated power switch and which is poled for forward conuction of said control pulses and a gate which is connected to receive said signal from the threshold detecting means.

30. The combination of claim 29 further including for each of said current cut-off circuits a gating transistor having a collector-emitter output circuit connected in series with said threshold detecting means and a base-emitter input circuit coupled in parallel with the control circuit of said associated power switch, said gating transistor being of the same polarity type as the associated transistor power switch whereby said output circuit is switched between a non-conductive and a conductive state synchronously with the power circuit of said associated power switch.

31. The combination of claim 30 wherein the threshold detecting means in each of said current cut-off circuits includes a Zener diode which is poled to be back biased by a voltage including the drop developed across the power circuits of the associated power switch and which is selected to have a reverse breakdown potential which is exceeded by the back bias applied thereacross when the current flow in the power circuit of said associated power switch exceeds said predetermined level.

32. The combination of claim 31 wherein each of said power switches is a PNP-type transistor, and further including in each of said current cut-off circuits a phase reversing means connected between said Zener diode and the gate of said silicon-controlled-rectifier.

33. The combination of claim 27 further including in each of said current cut-off circuits a gating means having an output circuit connected in series with said threshold detecting means and an input circuit connected in parallel with the control circuit of said associated power switch for receiving said control pulses, said output circuit being switched between a non-conductive and a conductive state in synchronism with the power circuit of said associated power switch whereby false switching of said switching device to its conductive state is prevented.

34. The combination of claim 33 further including, for each of said current cut-off circuits, a delay means connected to the input circuit of said gating means to delay the application of said control pulses thereto whereby said switching device is held in its non-conductive state for a predetermined time after the power circuit of the associated power switch has switched to its conductive state regardless of the level of current flow through said power circuit.

35. The combination of claim 33 further including for each of said current cut-off circuits a delay means connected in circuit with said threshold detecting means whereby said switching device is switched to its conductive state only when the current flow in the power circuit of said associated power switch exceeds said predetermined level for a predetermined time.

36. In combination with an electrical discharge machining power supply for providing discharges through one or more ionizable gaps each of which is defined between a respective electrode and a conductive workpiece; said power supply including a bank of parallel electronic switches for each of said electrodes; the electronic switches of each bank each including an input circuit connected in parallel receiving a succession of control pulses, and an output circuit connected in parallel with the output circuits of the other switches of said bank between a power source and one of said electrodes, the input circuit of each of said electronic switches being responsive to each of said control pulses to switch the output circuit thereof from a non-conductive to a conductive state; a plurality of current cut-off circuits for each of said banks; each of said current cut-off circuits being associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predetermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conducive state only when the output circuits of the associated switches are normally in their non-conductive states.

37. The power supply of claim 36 wherein said current cut-off circuits have respective increasingly higher threshold levels whereby the current flow through the output circuits of each portion of said switches is interrupted at a level different than the level at which the current flow through the output circuits of the other portions of said switches is interrupted.

38. The power supply of claim 37 wherein said increasingly higher threshold levels are selected so that after each but the highest of them is exceeded there is a reduction in the sum of the currents that can be carried by the output circuits of the switches of said bank that remain in their conductive states without another of said threshold levels being exceeded.

39. In an electrical discharge machining power supply for providing discharges through one or more ionizable gaps each of which is defined between a respective electrode and a conductive workpiece, said power supply having a power switch means for each of said electrodes to couple the electrode to a power source and a control means coupled to intermittently open and close said power switch means to provide a series of power pulses across said electrodes and said workpiece, the combination of a capacitive storage circuit for each of said electrodes, and a switching means for selectively connecting and disconnecting each of said capacitive storage circuits across a respective one of said electrodes and said workpiece for capacitor discharge-type and pulse-type operation respectively, each of said capacitive storage circuits being repeatedly effective when connected across said one electrode and said workpiece to charge to a sufficient level to ionize the gap defined therebetween and to thereafter discharge therethrough.

40. The power supply supply of claim 39 further including a pilot pulse means, and wherein said switching means coupled said pilot pulse means across at least a portion of said electrodes and said workpiece for pulse-type operation with said pilot pulse means being effective during pulse-type operation to apply across said portion of said electrodes and said workpiece high voltage gap ionizing pulses which are synchronized with said power pulses.

41. The power supply of claim 39 wherein each of said power switch means is an electronic power switch having a power circuit for coupling a respective one of said electrodes to a power source and a control circuit responsive to each of a succession of control pulses applied thereto for switching said power circuit from a non-conductive to a conductive state, and said control means is coupled to the control circuit of each of said power switches for applying said control pulses thereto; and further including a current cut-off circuit associated with each of said power switches to interrupt an excessive current flow in the power circuit thereof without affecting the operation of the other power switches; each of said current cut-off circuits including a switching device connected across the control circuit of the associated power switch and a threshold detecting means coupled between the power circuit of said associated power switch and said switching device, said threshold detecting means being responsive when the power circuit of the associated power switch is in its conductive state to the current flow therethrough exceeding a predetermined level for applying a signal to switch said switching device to a conductive state thereby providing substantially a short circuit across the control circuit of the associated power switch to cause the power circuit thereof to revert to its non-conductive state, said switching device being of the type that latches when switched to its conductive state and thereafter resets only during the period that the power circuit of the associated power switch is normally in its non-conductive state.

42. The power supply of claim 41 further including a pilot pulse means for supplying high voltage gap ionizing pulses which are synchronized with said power pulses, and wherein said switching means connects said pilot pulse means across at least a portion of said electrodes and said workpiece for pulse-type operation.

43. The power supply of claim 42 wherein each of said power switch means include a bank of parallel electronic switches, each of said parallel switches having an input circuit connected in parallel with the input circuits of the other switches of said bank and an output circuit connected in parallel with the output circuits of the other electronic switches of said bank between said power source and one of said electrodes, and wherein said control means applies a succession of control pulses to the input circuit of each of said electronic switches for switching the output circuit thereof from a non-conductive to a conductive state; said power supply further including a plurality of current cut-off circuits for each of said banks, each of said current cut-off circuits being associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predeermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conductive state only when the output circuits of the associated switches are normally in their non-conductive states.

44. The power supply of claim 43 wherein said current cut-off circuits have respective increasingly higher threshold levels whereby the current flow through the output circuits of each portion of said switches is interrupted at a level different that the level at which the current flow through the output circuits of the other portions of said switches is interrupted.

45. The power supply of claim 44 wherein said increasingly higher threshold levels are selected so that after each but the highest of them is exceeded there is a reduction in the sum of the currents that can be carried by the output circuits of the switches of said bank that remain in their conductive states without another of said threshold levels being exceeded.

46. The power supply of claim 42 further including for each of said current cut-off circuits a gating means connected in series with said threshold detecting means, said gating means being closed only when the power circuit of said associated power switch is in its conductive state whereby false switching of said switching device to its conductive state is prevented.

47. The power supply of claim 39 wherein each of said power switch means is an electronic power switch having a power circuit for coupling a respective one of said electrodes to a power source and a control circuit responsive to each of a succession of control pulses applied thereto for switching said power circuit from a non-conductive to a conductive state, and said control means is coupled to the control circuit of each of said power switches for applying said control pulses thereto; and further including a pilot pulse means for supplying high voltage gap ionizing pulses which are synchronized with said power pulses; said pilot pulse means including an electronic pilot pulse switch having a power circuit connected in series with a high voltage source and a control circuit connected in parallel with the control circuit of at least one of said power switches for receiving said control pulses, the control circuit of said pilot pulse switch being responsive to each of said control pulses for switching the power circuit thereof from a non-conductive to a conductive state; and said switching means coupling said pilot pulse means across at least a portion of said electrodes and said workpiece only during pulse-type operation.

48. The power supply of claim 47 further including a current cut-off circuit associated with each of said power switches for interrupting an excessive current flow through the power circuit of the associated power switch without affecting the operation of the other power switches; each of said current cut-off circuits including a normally non-conductive switching device connected across the control circuit of the associated power switch and a threshold detecting means coupled between the power circuit of said associated power switch and said switching device, said threshold detecting means being responsive when the power circuit of said associated power switch is in its conductive state to the current flow therethrough exceeding a predetermined level for supplying a signal to switch said switching device to a conductive state thereby causing the power circuit of the associated power switch to revert to its non-conductive state, said switching device being of the type that latches when switched to its conductive state and that thereafter resets to its non-conductive state only during the period that the power circuit of the associated power switch is normally in its non-conductive state.

49. The power supply of claim 48 wherein each of said power switches is a transistor having a collector-emitter power circuit and a base-emitter control circuit, each of said switching devices is a silicon-controlled-rectified having an anode-cathode circuit which is connected across the control circuit of the associated power switch and poled for forward conduction of said control pulses and a gate which is connected to said threshold detecting means, and each of said threshold detecting means includes a Zener diode which is poled to be back biased by a voltage including the drop developed across the power circuit of the associated power switch and which is selected to have a reverse breakdown potential that is exceeded by said back bias when the current flow through the power circuit of the associated power switch exceeds said predetermined level.

50. The power supply of claim 49 further including in each of said current cut-off circuits a gating transistor which is of the same polarity type as the associated power switch, said gating transistor having a collector-emitter output circuit which is connected in series with said threshold detecting means and a base-emitter input circuit which is connected in parallel with the control circuit of said associated power switch whereby said output circuit is switched between a non-conductive state and a conductive state in synchronism with the power circuit of the associated power switch.

51. The power supply of claim 50 wherein said power switches and said gating transistors are PNP-type transistors, and further including in each of said current cut-off circuits a phase reversing means coupled between said threshold detecting means and the gate of said silicon-controlled-rectifier for properly polarizing the signal supplied by said threshold detecting means to cause said silicon-controlled-rectifier to fire in response thereto.

52. The power supply of claim 47 wherein each of said power switches includes a bank of parallel electronic switches, said parallel switches each having an input circuit connected in parallel with the input circuits of the other switches of said bank to form the control circuit of said power switch and an output circuit connected in parallel with the output circuits of the other switches of said bank to form the power circuit of said power switch, the input circuit of each of said parallel switches being responsive to each of said control pulses to switch the output circuit thereof from a non-conductive to a conductive state; said power supply further including a plurality of current cut-off circuits for each of said banks, each of said current cut-off circuits being associated with a respective portion of the electronic switches of said bank and including a normally non-conductive switching device connected across the input circuits of the associated switches and a threshold detecting means coupled between the output circuits of the associated switches and said switching device, said threshold detecting means being responsive when the output circuits of the associated switches are in their conductive states to the current flow therethrough exceeding a predetermined threshold level to provide a signal for switching said switching device to a conductive state thereby providing substantially a short circuit across the input circuits of the associated switches and causing the output circuits thereof to revert to their non-conductive states whereby the current flow therethrough is interrupted, and said switching device being of the type that is latched when switched to its conductive state and that is thereafter reset to its non-conductive state only when the output circuits of the associated switches are normally in their non-conductive states.

53. The power supply of claim 52 wherein said current cut-off circuits have respective increasingly higher threshold levels whereby the current flow through the output circuits of each portion of said switches is interrupted at a level different than the level at which the current flow through the output circuits of the other portions of said switches is interrupted.

54. The power supply of claim 53 wherein said increasingly higher threshold levels are selected so that after each but the highest of them is exceeded there is a reduction in the sum of the currents that can be carried by the output circuits of the switches of said bank that remain in their conductive states without another of said threshold levels being exceeded.

55. The power supply of claim 47 wherein said power source has a high output voltage for capacitor discharge-type operation and a low output voltage for pulse-type operation; and further including a respective current limiting means connected in series with the power circuit of each of said power switches to limit the current drawn therethrough during capacitor discharge-type operation, a shorting switch connected in parallel with each of said current limiting means to eliminate the effect thereof for pulse-type operation, and means for coupling said power source in voltage aiding relationship with said high voltage source during pulse-type operation.

56. The power supply of claim 55 wherein each of said power switches is a transistor having a collector-emitter power circuit and a base-emitter control circuit, said pilot pulse switch is a transistor which is of the same polarity type as said power switches and which has a collector-emitter power circuit and a base-emitter control circuit; and further including in series with the power circuit of each of said power switches a unidirectional conducting means for preventing reverse current flow therethrough.

57. The power supply of claim 56 further including a current cut-off circuit associated with each of said power switches for interrupting an excessive current flow in the power circuit thereof without affecting the operation of the other power switches; each of said current cut-off circuits including a silicon-controlled-rectifier and a Zener diode, said silicon-controlled-rectifier having a gate and an anode-cathode circuit; said anode-cathode circuit being connected across the control circuit of said associated power switch; said Zener diode being coupled between the power circuit of the associated power switch and the gate of said silicon-controlled-rectifier, being poled to be back biased by a voltage applied thereacross including the drop developed across the power circuit of the associated power switch, and being selected to have a reverse breakdown potential that is exceeded by said back bias when the current flow in said power circuit exceeds said predetermined level thereby causing said silicon-controlled-rectifier to fire and the power circuit of said associated power switch to revert to its non-conductive state.

58. The power supply of claim 57 further including in each of said current cut-off circuits a gating transistor, said gating transistor being of the same polarity type as the associated power switch and having a collector-emitter output circuit connected in series with said Zener diode and a base-emitter control circuit connected in parallel with the control circuit of said associated power switch for receiving said control pulses, the output circuit of said gating transistor being switched from a non-conductive to a conductive state by each of said control pulses synchronously with the power circuit of the associated power switch whereby false firing of said silicon-controlled-rectifier is prevented.

References Cited
UNITED STATES PATENTS 3,360,683   12/1967   Indue   315—227X
3,364,334   1/1968   Sato et al.   315—200X JOHN HUCKERT, Primary Examiner R. F. POLISSACK, Assistant Examiner U.S. Cl. X.R.

315—119, 121, 123, 200, 201, 203, 205, 240, 241, 287; 307—125, 127, 131; 317—7, 9; 219—131

Disclaimer and Dedication 3,558,998.—*Robert B. Bertolasi*, Rockford, Ill. REVERSIBLE POLARITY UNIVERSAL ELECTRICAL DISCHARGE MACHINING POWER SUPPLY WITH CURRENT CUT-OFF. Patent dated Jan. 26, 1971. Disclaimer and dedication filed Sept. 19, 1974, by the assignee, *Amsted Industries Incorporated*.

Hereby disclaims and dedicates to the Public the remaining term of said patent.

[*Official Gazette July 8, 1975.*]